United States Patent [19]

Sailer et al.

[11] 3,918,001

[45] Nov. 4, 1975

[54] APPARATUS FOR PRODUCING TWO HILBERT TRANSFORM RELATED SIGNALS

[75] Inventors: Heinrich Sailer; Norbert Schatz, both of Munich; Gero Schollmeier, Gauting, all of Germany

[73] Assignee: Siemens Aktiengesellschaft, Berlin & Munich, Germany

[22] Filed: June 18, 1973

[21] Appl. No.: 370,700

[30] Foreign Application Priority Data

June 22, 1972 Germany ............................ 2230597

[52] U.S. Cl. .................................... 325/137; 332/45

[51] Int. Cl.$^2$ ............................................ H04B 1/68

[58] Field of Search ........... 307/213, 221, 269, 271, 307/303; 235/150, 52, 197, 152; 328/61; 332/44, 45; 325/49, 50, 136, 137, 138; 340/347 D, 347A, 347 DD

[56] References Cited

UNITED STATES PATENTS

| | | | |
|---|---|---|---|
| 3,605,017 | 9/1971 | Chertok et al. | 325/49 X |
| 3,611,143 | 10/1971 | Van Gerwen | 325/38 A |
| 3,624,427 | 11/1971 | Dijkmans | 307/221 X |
| 3,793,589 | 2/1974 | Puckett | 325/137 |
| 3,835,391 | 9/1974 | Fang | 325/136 |

*Primary Examiner*—Benedict V. Safourek

[57] ABSTRACT

A circuit arrangement for generating two signals having a relationship to each other defined by the Hilbert Transform is described. First and second digital filters having, respectively, first and second groups of coefficient producing components which are connected, respectively, to the individual stages forming a shift register are provided. The first and second groups of coefficient producing components have component values determined on the basis of +45° and −45° phases. The individual components of like value in each group are connected to the stages of the shift register in the same or reverse order in dependence on the direction of transmission of the input signal.

7 Claims, 12 Drawing Figures

APPARATUS FOR PRODUCING TWO HILBERT TRANSFORM RELATED SIGNALS

BACKGROUND OF THE INVENTION

The present invention relates to an arrangement for generating two signals bearing a relationship to each other defined mathematically by the Hilbert Transform. The Hilbert Transform in this concept is defined by the following equation:

$$f(t) = \frac{1}{2\pi} \int_{-\infty}^{+\infty} F(\ )e^{j\omega t}\, d\omega,$$

where $F(\omega)$ is an even function of frequency and $f(t)$ is an odd function of time.

It is known that a single-sideband signal can be generated by modulating two carriers phase-displaced from each other by 90° with two Hilbert Transforms related signals and adding the resultant signals. To do this, the two Hilbert Transform signals may be generated, as is known, by means of two digital filters. This technique has the disadvantage that the coefficient producing component arrangements of the two digital filters are different.

An object of this invention is to provide apparatus for generating two signals having a relationship to each other defined by the Hilbert Transform, which apparatus requires fewer components than has heretofore been the case.

SUMMARY OF THE INVENTION

In accordance with the invention, the foregoing and other objects are achieved by providing in an arrangement of the type discussed hereinabove a first coefficient producing component arrangement for a coefficient term of a first type and an identical second coefficient producing component arrangement for a coefficient term of a second type. To achieve this purpose, the coefficient components of the first type and of the second type are determined on the basis of a +45° or −45° phase. The coefficient components of the first type or of the second type, relative to the direction of transmission of the input signal, are connected to the delay elements in normal or in inverse order.

The arrangement according to the invention is, thus, characterized by the use of the two identical coefficient component arrangements, which becomes particularly advantageous if the coefficient component arrangement is constructed in integrated form.

If the input signal has more than two amplitude levels, which are represented by binary signals, it is convenient to provide two digital filters for each binary signal and to connect the outputs of the digital filters to adding circuits over further coefficient components.

The two Hilbert Transform related signals may, for example, be produced for measuring purposes. However, these signals may also be used for producing a single-side band transmission signal. In this case, it is convenient to connect the outputs of the two digital filters to an amplitude modulator over a low-pass filter, these outputs being operated with carriers phase displaced by 90°. To do this, the outputs of the amplitude modulators are connected to an additional adding circuit, over which the single-side band signal is provided.

BRIEF DESCRIPTION OF THE DRAWINGS

The principles of the invention will be more readily understood by reference to the description of preferred embodiments given hereinbelow in conjunction with the 12 figures of the drawings. In the several views like signs denote like parts and signals. The individual figures are briefly described as follows.

DETAILED DESCRIPTION OF THE DRAWINGS

Figure 1:
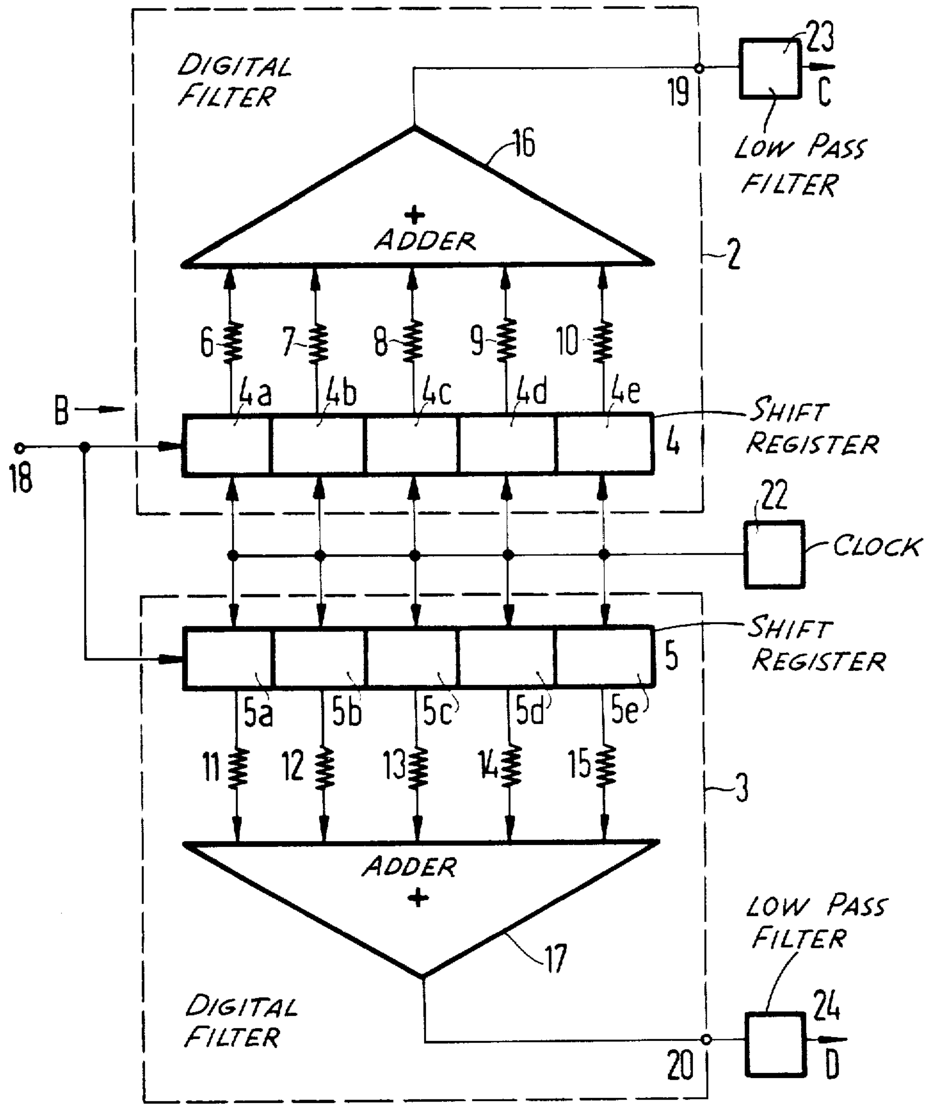
FIG. 1 is a schematic diagram of a circuit arrangement of known construction for producing two signals having a relationship defined by the Hilbert Transform.

FIG. 1 shows a circuit arrangement of known construction for generating two signals having a relationship to each other defined by the Hilbert Transform. This prior art circuitry comprises the two digital filters 2 and 3 as described, for example, in the publication AEÜ, Volume 21/1967, No. 7, pages 354 to 362, and particularly at page 356, right-hand column. Each of these digital filters comprises a series combination of delay elements, which are connected to each adding circuit over coefficient producing components.

As shown in FIG. 1, binary stages 4*a*, 4*b*, 4*c*, 4*d*, 4*e*, and 5*a*, 5*b*, 5*c*, 5*d*, and 5*e* are provided as delay elements and form the shift registers 4 and 5. The stages 4*a* and 5*a* to 5*e* are connected to the adding circuits 16 or 17 over the coefficient producing components 6 to 15. The input signal B is routed over terminal 18, and step-like signals are provided over the terminals 19 and 20. The clock 22 supplies incremental pulses for the operation of the shift registers 4 and 5.

Figure 2:
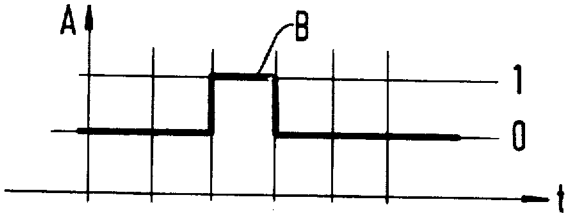
FIG. 2 is an amplitude-time wave form diagram illustrating the two digital filters in the FIG. 1 embodiment.

A digital signal is routed as input signal B, which signal can assume at least two amplitude stages. For clearer identification, signal B is shown in FIG. 2 as a binary signal, which can assume levels corresponding to the bits 0 and 1 within a preassigned bit frame. To do this, units of the time $t$ are plotted along the $x$-axis. Information is transmitted as a function of the time of occurrence of the bits subject to a predetermined coding.

The bits of the input signal B are sequentially placed in storage in the stages 4*a* to 4*e* and 5*a* to 5*e*, and signals are provided to the adding circuits 16 or 17 as a function of the bits stored at a given moment and as a function of the coefficient components 6 to 15.

The determination of the coefficient components 6 to 15 is dependent on the desired transmission characteristic of the digital filters 2 and 3. By way of example, the filters 2 and 3 may have the transmission characteristic apparent from FIGS. 3 and 4. The directions of abscissas relate to the frequency F, the direction of ordinates of FIG. 3 to the amplitude A, and the direction of ordinates of FIG. 4 to the phase P. The transmission characteristic of the digital filter 2 or 3 may, for example, be characterized by the frequency response shown in FIG. 3 and by the phase-versus-time curve P1 with a 0° phase shown in FIG. 4 or by the phase-versus-time curve P2 with a 90° phase.

Figure 5:
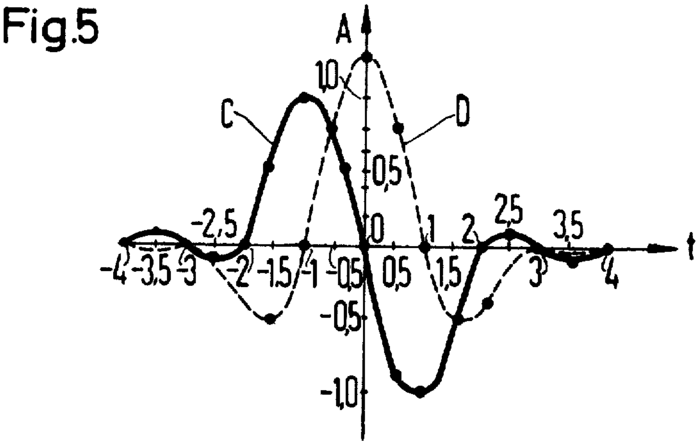
FIG. 5 is a waveform diagram illustrating the two Hilbert Transform signals as generated with the arrangement shown in FIG. 1.

Step-like signals are provided to the low-pass filters 23 or 24 over the outputs 19 or 20. The signals C or D bearing a Hilbert Transform determined relationship to each other shown in FIG. 5 are provided from these low-pass filters 23 or 24.

Figure 3:
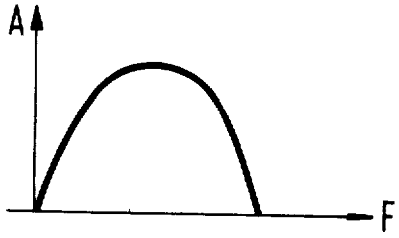
FIG. 3 is an amplitude-frequency diagram showing the transmission characteristics of the digital filters according to FIG. 1.
Figure 4:
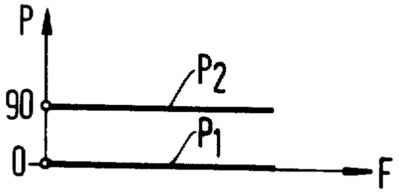
FIG. 4 is a phase-frequency diagram further illustrating the transmission characteristics of the FIG. 1 embodiment.

If the transmission characteristic of FIGS. 3 and 4 are to be achieved, and if not five, but 19, coefficient components 60 to 78, instead of the coefficient components 6 to 10 are provided and, furthermore, 19 coefficient components 79 to 97 instead of the coefficient components 11 to 15, then one obtains the amplitudes of the signals C and D shown in Table 1. Values of the time $t$ are plotted in the first column of Table 1. The second column contains the coefficient components 60 to 78, and the third column contains the corresponding amplitudes of signal C. These amplitudes are obtained through the following equation:

$$A_C = \frac{2 \sin(\pi t)}{\pi (t^2 - 1)}$$

The fourth column of Table 1 contains the coefficient components 79 to 97, and the fifth column the corresponding amplitudes of signal D.

Table 1

| Time t | Coefficient Glieder² | Amplitudes of signal C | Coefficient Glieder² | Amplitudes of signal D |
|---|---|---|---|---|
| –4, 5 | 60 | –0, 0331 | 79 | –0, 0331 |
| –4 | 61 | 0 | 80 | –0, 0849 |
| –3, 5 | 62 | 0, 0566 | 81 | –0, 0566 |
| –3 | 63 | 0 | 82 | 0 |
| –2, 5 | 64 | –0, 1212 | 83 | –0, 1212 |
| –2 | 65 | 0 | 84 | –0, 4244 |
| –1, 5 | 66 | 0, 5093 | 85 | –0, 5093 |
| –1, 0 | 67 | 1 | 86 | 0 |
| –0, 5 | 68 | 0, 8488 | 87 | 0, 8488 |
| 0 | 69 | 0 | 88 | 1, 273 |
| 0, 5 | 70 | –0, 8488 | 89 | 0, 8488 |
| 1 | 71 | –1 | 90 | 0 |
| 1, 5 | 72 | –0, 5093 | 91 | –0, 5093 |
| 2 | 73 | 0 | 92 | –0, 4244 |
| 2, 5 | 74 | 0, 1212 | 93 | –0, 1212 |
| 3 | 75 | 0 | 94 | 0 |
| 3, 5 | 76 | –0, 0566 | 95 | –0, 0566 |
| 4 | 77 | 0 | 96 | –0, 0849 |
| 4, 5 | 78 | 0, 0331 | 97 | –0, –331 |

Table 2

| Time t | Coefficient Glieder² | Amplitudes of signal C | Coefficient Glieder | Amplitudes of signal D |
|---|---|---|---|---|
| –4, 5 | 100 | –0, 0468 | 119 | 0 |
| –4 | 101 | –0, 0600 | 120 | –0, 06 |
| –3, 5 | 102 | 0 | 121 | –0, 08 |
| –3 | 103 | 0 | 122 | 0 |
| –2, 5 | 104 | –0, 1714 | 123 | 0 |
| –2 | 105 | –0, 300 | 124 | –0, 300 |
| –1, 5 | 106 | 0 | 125 | –0, 7203 |
| –1 | 107 | 0, 7071 | 126 | –0, 7071 |
| –0, 5 | 108 | 1, 200 | 127 | 0 |
| 0 | 109 | 0, 900 | 128 | 0, 900 |
| 0, 5 | 110 | 0 | 129 | 1, 200 |
| 1 | 111 | –0, 7071 | 130 | 0, 7071 |
| 1, 5 | 112 | –0, 7203 | 131 | 0 |
| 2 | 113 | –0, 3000 | 132 | –0, 300 |
| 2, 5 | 114 | 0 | 133 | –0, 1714 |
| 3 | 115 | 0 | 134 | 0 |
| 3, 5 | 116 | –0, 08 | 135 | 0 |
| 4 | 117 | –0, 06 | 136 | –0, 0600 |
| 4, 5 | 118 | 0 | 137 | –0, 0468 |

These amplitudes $A_D$ result from the following equation:

$$A_D = \frac{2[1 + \cos(\pi t)]}{\pi (1 - t^2)}$$

The absolute values of the amplitudes of signals C and D correspond to the values of the conductances of the coefficient components, e.g., resistors in millimhos, it being understood that the adders 16 and 17 shown in FIG. 1 have positive and negative inputs, whereby values introduced over the positive or negative inputs are added or subtracted. The coefficient components to which positive or negative amplitudes are allocated are connected with positive or negative inputs of the adders 16 or 17. By way of example, the coefficient component 60 is connected with a negative input of the adding circuit and the coefficient component 88 with a positive input of the adding circuit 17.

FIG. 5 shows the signals C and D which have the Hilbert Transform relationship. The $x$-axis is calibrated with the time $t$ and the $y$-axis with the amplitude $A$ of the signals shown.

Figure 6:
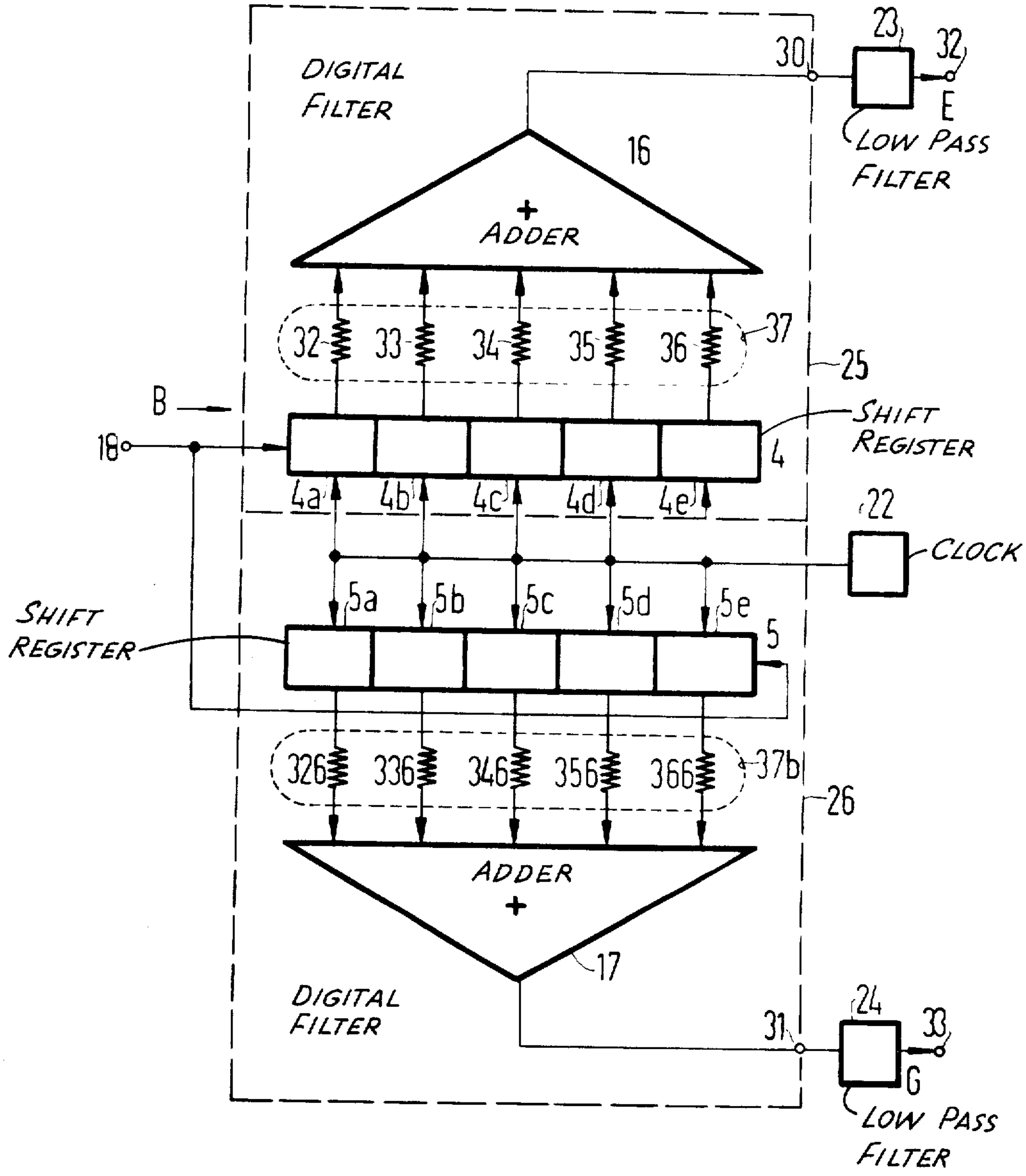
FIG. 6 is a schematic diagram of a second preferred embodiment of apparatus constructed according to the invention for generating two Hilbert Transform related signals by means of two shift registers.

FIG. 6 shows a preferred embodiment of the invention and is an arrangement for generating two signals having a Hilbert Transform relationship by means of the two digital filters 25 and 26. Instead of the coefficient components 6 to 15 shown in FIG. 1 there are provided in FIG. 6 the coefficient components 32 to 36 forming a first group and the coefficient components 326 to 366 forming a second group, the coefficient components 32 and 326 being determined in like manner. The coefficient components 33 and 336, 34 and 346, 35 and 356, 36 and 366 are also determined in the same manner.

Figure 7:
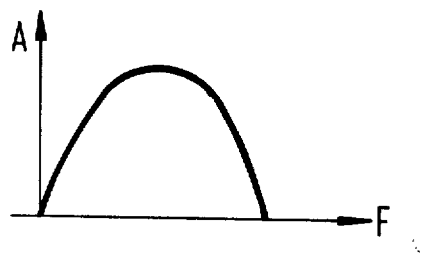
FIGS. 7 and 8 show, respectively, the transmission characteristics of the digital filters employed in the FIG. 6 embodiment.
Figure 8:
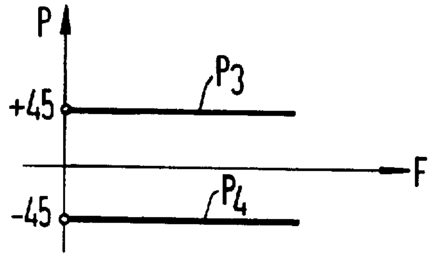

With regard to the transmission characteristics of the digital filters 25 and 26, it is assumed, for example, that transmission characteristics in accordance with FIGS. 7 and 8 are desired. In particular, with regard to the digital filter 25 a transmission characteristic according to the frequency response of FIG. 7 and with a phase of +45° according to the phase-versus-time curve P3 is assumed, and with regard to the filter 26 a frequency response according to FIG. 7 and a phase of –45° according to curve P4 is assumed.

FIG. 6 clearly shows that the coefficient components 32 to 36, compared to the coefficient components 326 to 366 and referred to the direction of transmission of the input signal B, are connected to the stages of the shift registers 4 or 5 in inverse sequence.

Step-like signals are provided to the low-pass filters 23 or 24 over the outputs 30 or 31, and the signals E and G having the Hilbert Transform relationship issue from the outputs thereof.

The arrangement of FIG. 6 is characterized by the fact that the coefficient component arrangements 37 and 37*b* are identical. This advantage is particularly significant if these coefficient component arrangements are provided in integrated form. If not only five, but 19, coefficient components 100 to 118 are provided, instead of the coefficient components 32 to 36 and 19 other coefficient components 119 to 137 are provided, instead of the coefficient components 326 to 366, the amplitudes of the signals E and G of Table 2 are obtained.

In Table 2, values of the time *t* are again plotted in the first column. The second column contains the coefficient components 100 to 118, and the third column contains the corresponding amplitudes of the signal E. The next column contains the coefficient components 119 to 137, and the following column contains the corresponding amplitudes of signal G. The absolute values of the amplitudes equal the values of the conductances in millimhos. Table 2 shows that the coefficient components 100 to 118, one after the other, equal the coefficient components 137 to 119.

If the conductances of the coefficient components 60 to 97 and 100 to 118 are labeled L60 to L97 and L100 to L118, the conductance L100 of the coefficient component 100 is obtained through the following equation:

$$L = (L60 + L97)\sqrt{2}$$

Similarly, the conductance $L101 = (L61 + L80)^2\sqrt{2}$. The following conductances L102 to L1180 can be obtained in like manner.

Figure 9:
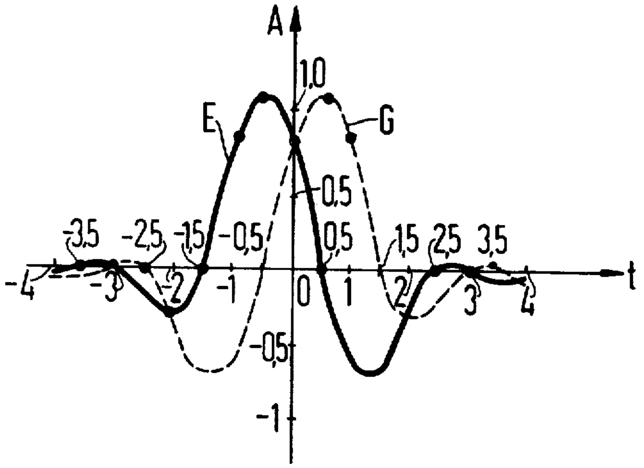
FIG. 9 is a waveform diagram illustrating the Hilbert Transform signals generated by means of the arrangement in accordance with FIG. 6.

FIG. 9 shows signals E and G. Units of the time *t* are plotted along the *x*-axis and units of the amplitude A are plotted along the *y*-axis. As shown in FIG. 9, signals E and G are mirror-images of each other and are arranged symmetrically to each other in relation to the axis $t = 0$.

Figure 10:
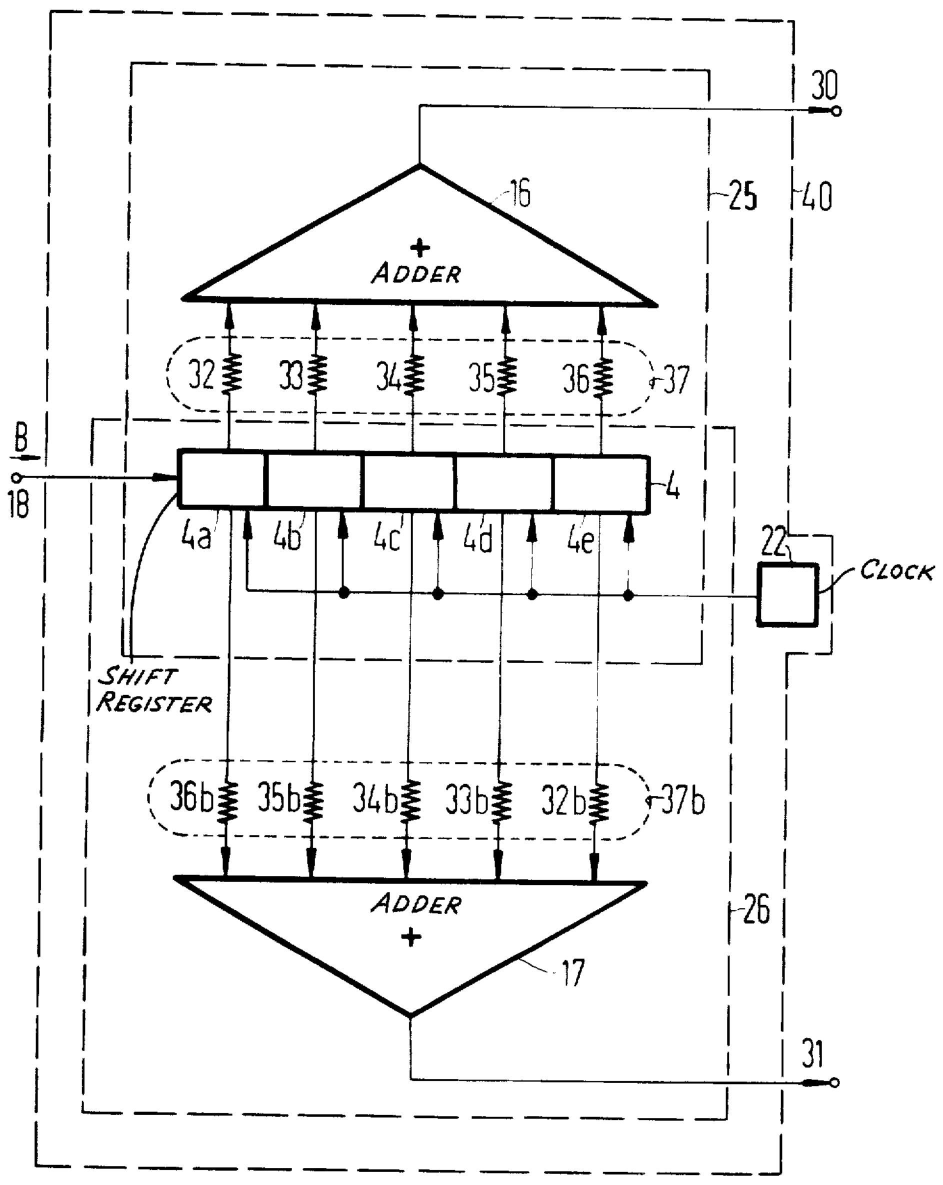
FIG. 10 is a schematic diagram of a second preferred embodiment of an arrangement for generating two related Hilbert Transform signals, in accordance with the invention, by means of a single shift register.

FIG. 10 shows another preferred embodiment, wherein only a single shift register 4 is provided instead of the two shift registers 4 and 5 according to FIG. 6.

Digital input signals B, which have two or more amplitude levels, can be routed to the arrangements in accordance with FIGS. 6 and 10. If the input signal B assumes only two amplitude levels, then binary shift registers 4 and 5, whose individual stages 4*a* to 4*e*, 5*a* to 5*e* can have two stable states each.

However, if the input signal B has more than two amplitude levels, it is fundamentally possible to design the shift registers 4 and 5 such that their stages can have as many stable states as the input signal B has amplitude stages. In this case, the individual stages of the shift registers 4 and 5 will have as many outputs as the number of amplitude levels provided, and each of these outputs will be connected to the adding circuit 16 or 17 over each coefficient component.

Figure 11:
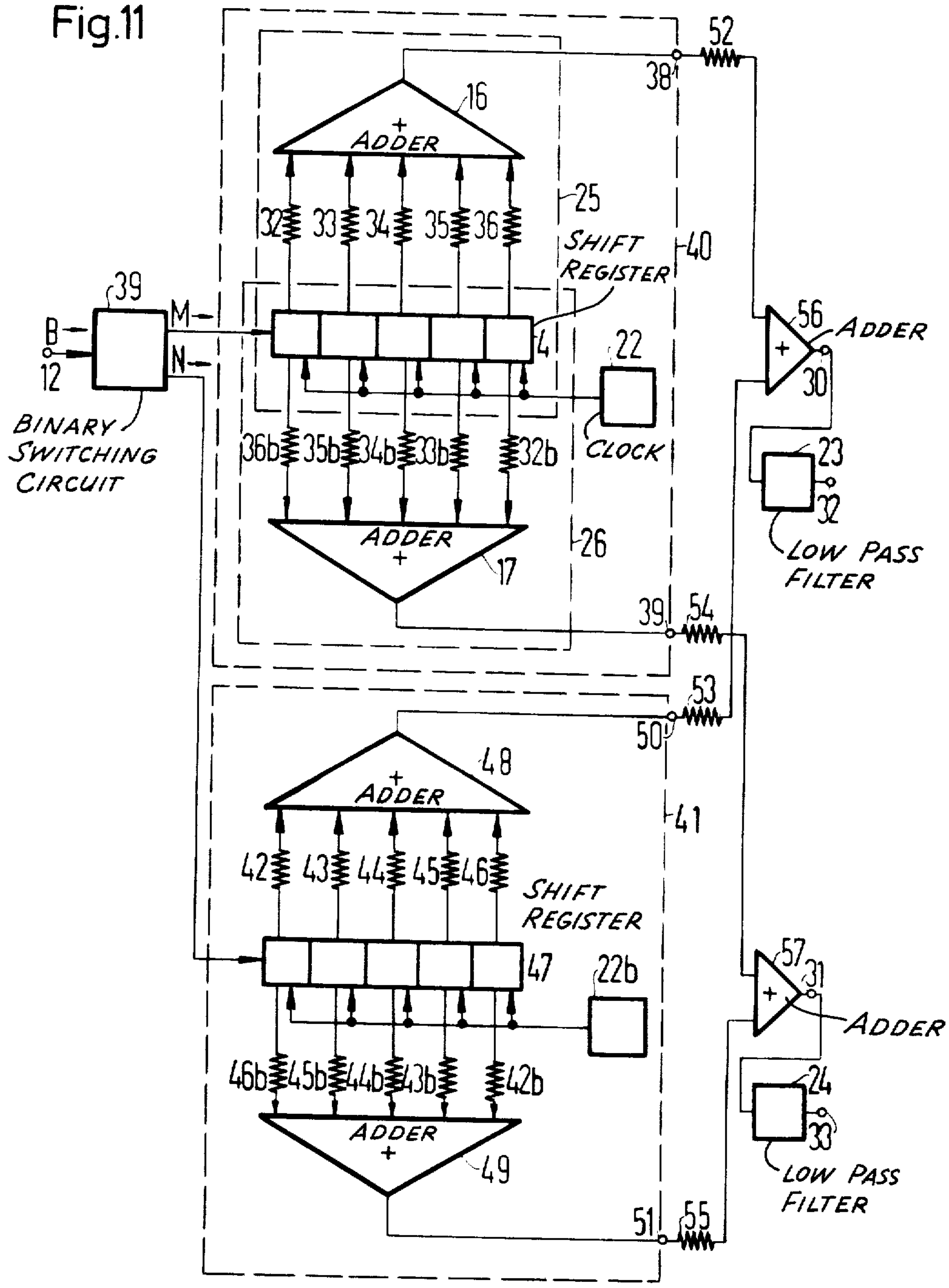
FIG. 11 is a schematic diagram of a third preferred embodiment, constructed according to the invention, of an arrangement for generating two related Hilbert Transform signals, to which is routed an input signal having more than two amplitude stages.

FIG. 11 shows another preferred embodiment of the invention, wherein an input signal B is assumed which is capable of having four amplitude levels. This input signal B is routed to a binary switching circuit 39, which derives two binary signals M and N corresponding to the signal B. If a multi-level input signal B is represented by several binary signals, circuit 39 is unnecessary.

The binary signal M is routed to the circuitry 40, which has already been described with reference to FIG. 10. Step-like signals are provided over the outputs 38 and 39. Similarly, binary signal N is routed to circuitry 41, which is constructed like circuitry 40. Circuitry 41 comprises the coefficient components 42 to 46, 42*b* to 46*b*, shift registers 47, clock 22*b* and the two adding circuits 48 and 49. Step-like signals are provided over the outputs 50 and 51.

The outputs 38 and 50 and 39 and 51, respectively, are connected to the adding stages 56 and 57 over other coefficient Glieder 52, 53, and 54, 55, respectively. The outputs of the adding circuits provide step-like signals to the low-pass filters 23 or 24. Signals having a Hilbert Transform relationship corresponding to the input signal B are provided over the outputs 32 or 33 of these low-pass filters 23 or 24.

Figure 12:
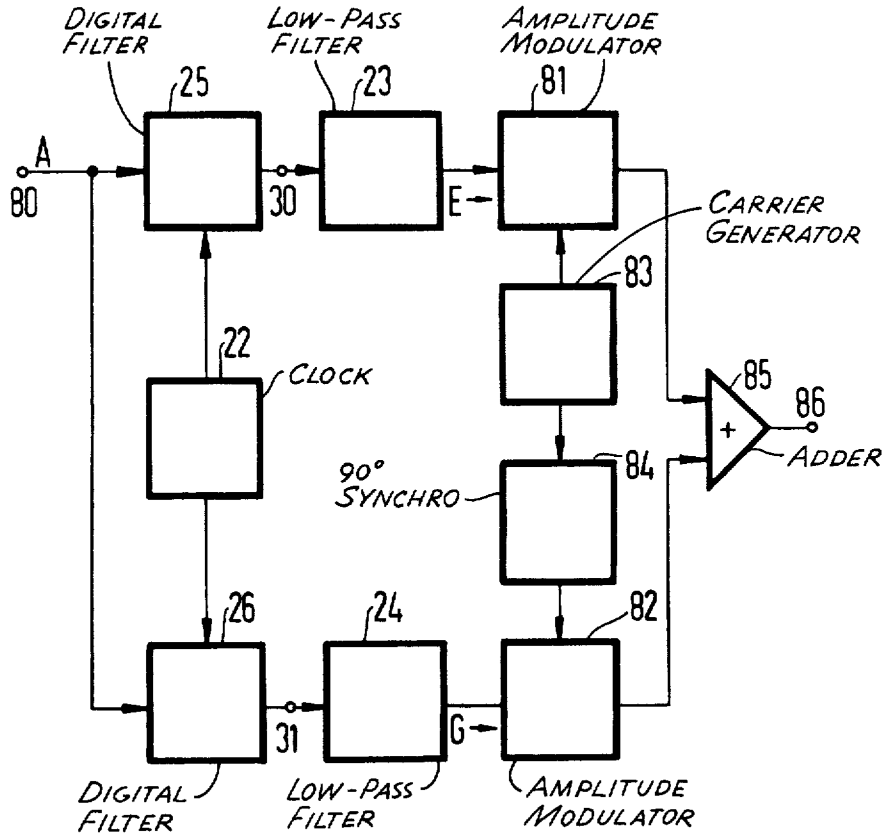
FIG. 12 is a block-schematic diagram of a circuit arrangement for generating a single-band signal by means of two related Hilbert Transform signals.

FIG. 12 shows a schematic diagram of an arrangement for generating a single-side band signal. The input signal B is routed to two digital filters 25 and 26 over terminal 80, and the Hilbert Transform related signals are sent to the low-pass filters 23 and 24 over the outputs 30 and 31, respectively. The signals E and G shown in FIG. 9 are transmitted to the amplitude modulators 81 and 82, respectively, from the outputs of the low-pass filters 23 and 24. These amplitude modulators 81 and 82 are operated by means of a carrier generator 83 and a 90° synchro 84 having carriers relatively displaced by 90°. Signals are provided to an adding circuit 85 over the outputs of the amplitude modulators 81 and 82, the single-side band signal being sent from an output 86 to adding circuit 85.

For example, the arrangements in accordance with the FIGS. 6, 10, and 11 may be used as digital filters 25 or 26. In principle, the use of the digital filters 2 or 3 shown in FIG. 1 instead of the digital filters 25 and 26 is known. However, the use of these prior art digital filters 2 and 3 has the disadvantage that the coefficient components 6 to 15 are generally different from one another, so that a comparatively large amount of apparatus is required if these coefficient components are to be provided.

The preferred embodiments described hereinabove are intended only to be exemplary of the principles of the invention, and they do not define the scope of the invention. It is contemplated that the described embodiments can be changed or modified within the scope of the invention as defined by the appended claims.

We claim:

1. Apparatus for generating two signals having a relationship defined by the Hilbert Transform comprising:

at least one series combination of a predetermined number of delay means, each said delay means forming a stage of said series combination, input means for receiving a digital input signal at the first of said stages in said series combination, first and second adding means, first and second groups of coefficient producing components, each said group being constituted by a number of said components equal to said predetermined number, said components of said first and second groups connecting, respectively, said stages to inputs of said first and second adding means, each said group having components of differing conductance values, but said groups having corresponding components of like values, the values of said components being determined so that said two signals have, respectively, +45° and −45° phases relative to said input signal, said components in said groups having like components connected to said stages in opposite sequences of values relative to the direction of transmission of said input signal through said series combination of delay elements and first and second output means from said first and second adding means from which are emitted two output signals having a relationship to each other defined by the Hilbert Transform.

2. The apparatus defined in claim 1 wherein said delay means are binary stages and said series combination forms a shift register.

3. The apparatus defined in claim 1 further comprising:

first and second amplitude modulators having inputs connected, respectively, to said first and second output means, means for producing two carrier signal phase displaced from each other by 90°, one of said carrier signals being coupled to said first modulator and the other to said second modulator and further adding means for receiving the outputs of said modulators and for producing therefrom a single sideband signal.

4. Apparatus for generating two signals having a relationship defined by the Hilbert Transform from an input having a number of amplitude levels in excess of two, comprising:

means for generating a binary signal for each two amplitude levels;

a number of digital filters corresponding to the number of binary signals produced by said generating means;

each digital filter comprising:

at least one series combination of a predetermined number of delay means, each said delay means forming a stage of said series, input means for receiving one of said binary signals at the first of said stages in said series combination, first and second adding means, first and second groups of coefficient procuding components, each said group being constituted by a number of said components equal to said predetermined number, said components of said first and second groups connecting, respectively, said stages to inputs of said first and second adding means, each said group having components of differing conductance values, but said groups having components of like values, the values of said components being determined on the basis of +45° and −45° phases, said components in said groups being connected to said stages in a like sequence of values or in a reverse sequence of values relative to the direction of transmission of said one binary signal through said series combination of delay elements and first and second output means from said first and second adding means;

additional adding means, and additional coefficient producing component means connecting said first and second output means in each said digital filter to inputs of said additional adding means, the outputs of said additional adding means producing two signals having a relationship defined by the Hilbert Transform.

5. Apparatus for generating two signals having a relationship defined by the Hilbert Transform comprising:

first and second series combinations of delay means, each said series combination having a predetermined number of delay means, each said delay means forming a stage of said series combination, first input means for receiving a digital input signal at the first of said stages in said first series combination, second input means for receiving said digital input signal at the last of said stages in said series combination, first and second adding means, first and second groups of coefficient producing components, each said group being constituted by a number of said components equal to said predetermined number, said components of said first and second groups connecting, respectively, said stages of said first and second series combinations to, respectively, inputs of said first and second adding means, each said group having components of differing conductance values, but said groups having corresponding components of like values, the values of said components being determined so that said two signals have, respectively, +45° and −45° phases relative to said input signal, said components in said first and second groups being connected so that corresponding components are connected to corresponding stages of like placement in said first and second series combinations in the same sequences of values, but in opposite sequences of values relative to the direction of transmission of said input signal through said first and second series combinations of delay elements and first and second output means from said first and second adding means from which are emitted two output signals having a relationship to each other defined by the Hilbert Transform.

6. The apparatus defined in claim 5 wherein said delay means are binary stages and said series combinations form shift registers.

7. The apparatus defined in claim 5 further comprising:

first and second amplitude modulators having inputs connected, respectively, to said first and second output means, means for producing two carrier signal phases displaced from each other by 90°, one of said carrier signals being coupled to said first modulator and the other to said second modulator and further adding means for receiving the outputs of said modulators and for producing therefrom a single sideband signal.

* * * * *